United States Patent Office 2,983,287
Patented May 9, 1961

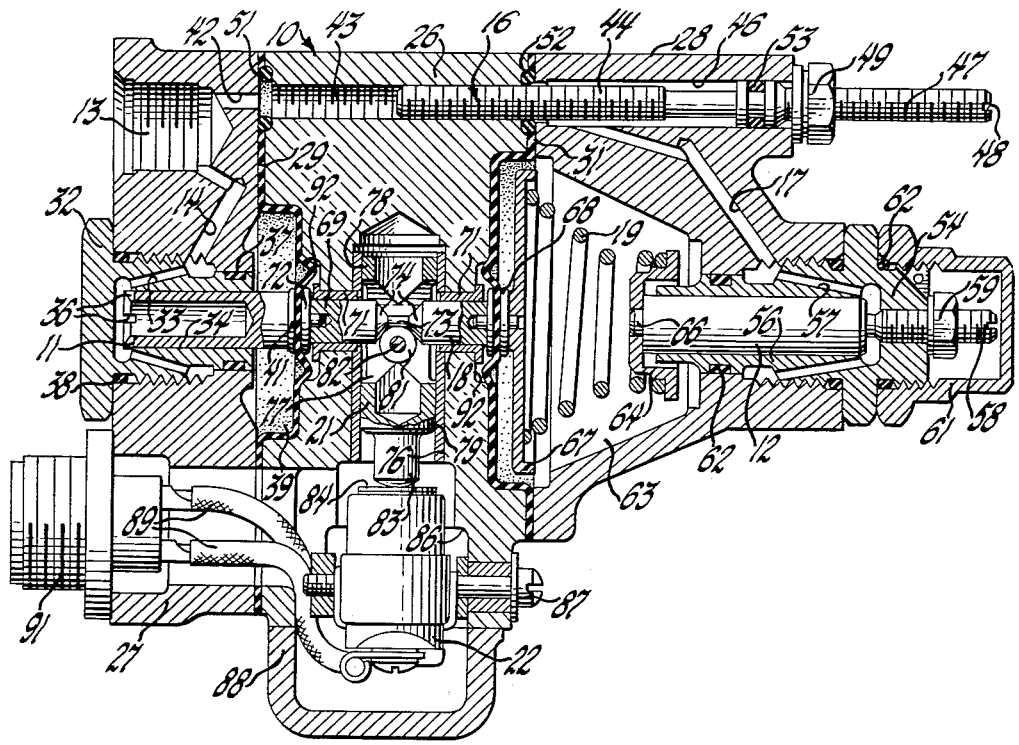

2,983,287

PRESSURE CHANGE RESPONSIVE DEVICE

Robert C. Keetch, Indianapolis, Ind., assignor to General Motors Corporation, Detroit, Mich., a corporation of Delaware Filed Mar. 7, 1957, Ser. No. 644,655

14 Claims. (Cl. 137—781)

This application is a continuation-in-part of my application Serial No. 629,633 filed December 20, 1956 (now abandoned).

My invention relates to a device responsive to change in pressure of a fluid to actuate some controlled device as, for example, a switch. While, of course, devices which respond to the magnitude of pressure of a fluid or to the sum of difference of two or more fluid pressures are well known, my invention is distinct from such devices in that it provides an apparatus which responds to a change in fluid pressure rather than to the magnitude of a presssure or pressures. Control devices according to the invention may be applied to various systems in which an indication of a change from a steady state condition, or the operation of some controlling devices in response thereto, may be desirable.

The nature of the invention and the advantages thereof will be clearly apparent to those skilled in the art from the succeeding detailed description of the preferred embodiment of the invention and the accompanying drawings in which:

Figure 1 is a sectional view of a pressure change responsive device.

Figure 2 is a fragmentary sectional view illustrating a detail.

Figure 3 is a fragmentary sectional view illustrating an optional check valve.

By way of introduction to the detailed description of the preferred structure of the device, it may be pointed out that it comprises a casing or body 10 within which are mounted the pistons 11 and 12 of two motor means. An inlet connection 13 in the body through which the controlling fluid is supplied is connected by an open conduit 14 to the piston 11 and through a variable restrictor 16 and conduit 17 to piston 12. Pistons 11 and 12 work in opposition to bias a slidable annular cam member or actuator 18, piston 11 being directly coupled to the actuator and piston 12 being coupled to the actuator through a compression spring 19. A cam follower member 21 slidable in the body at right angles to the movement of cam 18 operates a switch 22 mounted in the case.

Under steady state conditions of pressure, the cam is at the center of its range of movement, as shown. Assuming, for example, that the pressure at inlet 13 increases rapidly, the fluid flows through the open conduit 14 and moves piston 11 to the right, camming the follower 21 downwardly and operating the switch. This movement is accompanied by compression of spring 19. Because of the restriction, fluid will flow slowly to piston 12, and as the fluid flows to the piston, it will move to the left, compressing spring 19. When the spring is compressed to a point where its force approximately equals that of piston 11, the cam will move back to its central position. Thus, after the response to the change in pressure level, the control device will reassume its neutral position and will remain in this condition until there is again a pressure change. A very gradual pressure change will not operate the switch because the piston 12 can follow such a gradual change.

A check valve 100 may be provided in parallel with the restrictor, as illustrated in Fig. 3, which by-passes the restrictor 16 when pressure changes in one direction (increase or decrease) so that the device responds only to change in the other direction.

Proceeding now to a detailed description of the structure shown in Figs. 1 and 2, the case or body 10 comprises three principal parts: a central portion 26, a first end cover 27, and a second end cover 28. These may be held together by studs or bolts (not shown). A flexible diaphragm 29 is mounted between the body members 26 and 27 and a similar flexible diaphragm 31 between the parts 26 and 28. The inlet 13, which is tapped for a pipe connection, is in the cover 27 and the open conduit 14 is defined by drilled passages in this cover. Piston 11 is mounted in a cylinder 34 defined by a plug 32 threaded into the cover 27. Passages 33 in this plug admit the fluid into the cylinder 34. The outer end of the piston is provided with notches 36 to admit the fluid to the piston when it seats against the head of the cylinder. The plug 32 is sealed by O-rings 37 and 38. A low pressure or drain chamber 39 is defined between the faces of body 26 and cover 27 around the piston 11. The piston bears against a wear plate 41 fixed to the flexible diaphragm 29. This diaphragm seals fluid which escapes into low pressure chamber 39 along the outer surface of piston 11.

A passage 42 in the cover connects inlet 13 to a threaded passage 43 extending through the body 26, within which is adjustably mounted a screw 44. The screw 44 and passage 43 constitute the restrictor. The screw 44 extends through a bore 46 in cover 28 and has a threaded outer end portion 47 extending from the cover. A slot 48 in the end of the screw provides for threading it more or less into the passage 43 to vary the resistance to flow of the restrictor. It will be understood that flow takes place principally through the clearance between the bottoms of the thread grooves and the crests of the threads, and that the length of the restricted passage is varied by moving the screw 44 into or out of passage 43. The adjustment is preserved by a jam nut 49. O-rings 51 and 52 are mounted in the face of body 26 and an O-ring 53 is mounted in a groove in the screw 44 to seal the restrictor structure against leakage.

The drilled passage 17 connects passage 46 downstream of the restrictor to a plug 54 threaded into the cover 28 which defines a cylinder 56 for piston 12. Drilled passages 57 in the plug admit the fluid to the cylinder behind piston 12, which is of equal area to piston 11. Plug 54 also mounts an adjustable stop or abutment for piston 12 comprising a stop screw 58 threaded into the plug and secured by a jam nut 59. The exposed end of the stop screw and the nut are protected by a threaded cap 61. O-rings 62 seal this structure against leakage.

The open end of cylinder 56 communicates with a second low pressure or drain chamber 63 principally in the cover 28 and partly in body 26, which is sealed by diaphragm 31 from the body 26. A spring retainer 64 piloted on a boss 66 on the end of the piston receives one end of compression spring 19, the other end of which is received by a retainer 67 in the center of which is received the wear plate 68 on the diaphragm 31.

The actuator or cam member 18 is a body of circular cross section, coaxial with the pistons, having cylindrical end portions 69 slidably mounted in bushings 71 in the main body 26. The ends of the cam member engage wear plates 72 on the diaphragms 29 and 31. The central portion 73 of the cam member is of reduced diameter and is joined to the end portions 69 by conical cam surfaces 74. The cam 18 cooperates with follower 21, which is slidably mounted in a bushing 76 in the body so as to move at right angles to the movement of cam 18. A transverse opening 77 in the cam follower provides clearance for the cam 18. Surfaces 78 and 79 near the ends of the follower are guided by the bushing 76. A roller 81 mounted on a shaft 82 extending transversely through the follower bears against cam 18. In the normal or neutral position illustrated, roller 81 engages both cam surfaces 74. The end portion 83 of the cam follower engages the operating lever 84 of switch 22, which may be a commercial snap action switch such as those sold under the trade-mark Micro Switch. This switch is adjustably mounted in a recess 86 in body 26 by bolts 87. A cover plate 88 provides access to the switch, which is connected through leads 89 to a suitable connector 91 mounted on cover 27.

As cam 18 moves in either direction from its neutral position, follower 21 will be cammed downwardly in the figure to operate switch 22. This movement is opposed by the actuating force required to operate the switch.

It may be noted that movement of the diaphragms 29 and 31 toward the cam follower 21 is permitted by movement of the flexible diaphragms into recesses 92 in the body 26. These recesses are of equal area so that the effective force on the cam 18 is not influenced by the fluid pressure in chambers 39 and 63. These, however, are preferably maintained at a low pressure and are maintained at the same pressure so that the operation of the cam is independent of the pressure level in chambers 39 and 63.

Referring to Figure 2, chambers 39 and 63 are connected to a drain or low pressure connection 93 which assures the presence of low and equal pressure in these chambers. Chamber 39 is connected to outlet 93 by a drilled passage 94 in cover 27. Chamber 63 is connected by passages 96 in cover 28, 98 in body 26, and 99 in cover 27 to the drain connection.

It should be noted that the device is shown in the figure under conditions which would obtain with a very low constant pressure in the inlet 13. This pressure is higher than the drain pressure, however, and will hold piston 11 in abutment with the cam 18. The pressure is below the minimum tension of spring 19 so piston 12 is against the stop 58. Under steady state condition at higher pressure, piston 11 would remain in the same position but piston 12 would be nearer the cam at a position determined by a balance between the pressure on the piston and the force of the spring. It should be noted that spring 19 has coils of varying diameter so that it is a variable rate spring. The larger coils tend to close under rather light pressure, and, as the larger coils are closed, the rate of the spring increases. The spring is configured so that the displacement of the spring is approximately proportional to the square root of the force exerted on it. The spring has a wide range of force, preferably about 100 to one.

The cam 18 tends to remain in its neutral position illustrated since, to move away from the neutral position, it must overcome the force of the spring in switch device 22 which biases follower 21 upwardly. It is best that there be a minimum force necessary to operate the switch, since otherwise the device would be sensitive to too small or too gradual pressure changes. The level of sensitivity may, of course, be suited to particular needs by the relation between the areas of the pistons, the slope of cam surfaces 74, and the centering force exerted by the spring in the switch. The spring force of the switch may be selected for a desired resistance, or, if a higher degree of resistance is required, an auxiliary spring biasing cam follower 21 upwardly could readily be provided.

The adjustable stop 58 for piston 12 provides for adjusting the outward limit of motion of the piston to a point at which the desired small initial tension is put on spring 19.

The actual threshold of operation of the switch is a function of the resistance to operation of the switch and of the setting of the restrictor 16. This threshold determines the rate of pressure change which will operate the switch. The threshold is higher at higher pressure levels because the spring 19 is under greater compression.

It may be pointed out that the piston 12 and spring 19 together serve not only as a fluid motor but in addition as a fluid accumulator which accumulates fluid behind piston 12, the volume of fluid in the accumulator remaining constant under constant pressure conditions, being greater the higher the pressure level. The rate of flow to or from the accumulator is governed by the pressure difference across the restrictor and the resistance to flow through it.

It is believed that the operation of the device will be clear from the previous description, but it may be set out briefly for convenience. In normal operation, the piston 11 will be in the position shown and piston 12 will have moved inward to some exent, depending upon the pressure level, compressing spring 19. The cam will be in its neutral position. Assuming a pressure drop in the inlet above a predetermined rate of change, fluid will flow slowly from cylinder 56 and rapidly from cylinder 34. Spring 19 will move cam 18 to the left as soon as the effective pressure difference between the pistons is greater than the resistance opposed by the switch and will operate the cam follower to actuate the switch. Assuming that the pressure remains constant at the level to which it has decreased, spring 19 will continue to bias piston 12 to the right, forcing the fluid out of cylinder 56. As spring 19 thus relaxes, its tension will decrease to a point near that of the pressure exerted by piston 11, whereupon the cam follower will move the cam 18 to its neutral position.

The action upon an increase in pressure level is similar. Fluid flows immediately to piston 11 which moves the cam to the right, compressing spring 19, and operating the switch. Fluid slowly flows through the restrictor into the accumulator space behind piston 12, gradually compressing spring 19 until the force of spring 19 nearly equals the force on piston 11, when the cam follower will neutralize the cam. It will be apparent, therefore, that switch 22 will be closed (or opened if so constructed) in response to larger or sudden pressure changes but will not be affected by changes which are so gradual they are below the threshold of the apparatus. The switch 22 may be connected to any indicating or controlling device which it is desired to operate in response to the pressure change.

The chambers 39 and 63 may be drained, but preferably are connected to a low pressure fluid line such that the chambers are maintained full of fluid under low pressure. The pressures in these chambers have no effect on the pistons or on the diaphragms since the pistons are of equal area, the recesses 92 are of equal area, and the pressures in the chambers 39 and 63 are equal because they are interconnected.

As to the threshold of the switch, any instantaneous change which increases or lowers the pressure force on piston 11 by an amount greater than the required axial force on cam 18 to actuate the switch will cause a response.

Gradual pressure changes will not operate the switch unless the rate of change, with respect to the setting of the restrictor, is such that flow through the restrictor is insufficient to keep the difference of pressure forces on the two pistons below the force required to move cam 18.

The threshold rate of change increases as pressure level increases, since at higher pressures less deflection of spring 19, and hence less flow, is required to accomplish a given amount of pressure change on piston 12.

Moving the switch 22 downward in the case will change the threshold slightly by increasing the displacement of cam 18 required to operate the switch.

In some installations it may be desirable to have the device respond only to changes of pressure in one direction, that is, either an increase or a decrease. This may be accomplished very simply by incorporating into the device the structure shown in Figure 3 including a check valve 100 connected in parallel with the restrictor 16. A stepped passage 101 is bored through the main body portion 26. This is connected by a drilled passage 102 in cover 27 with the inlet 13, and by a passage 104 in cover 28 with the bore 46 at the other end of the restrictor. The passage 101 mounts the check valve 100, which comprises a body 106 having a passage therethrough which is stepped to provide a seat 107 for a check ball 108. The ball 108 is biased against the seat by a light compression spring 109 retained by an annular plug 111 threaded into the body 106. The check valve body is held seated against a shoulder 112 in the passage 101 by an annular threaded setscrew 113. Leakage of fluid past the check valve body may be prevented by an O-ring 114 mounted in a circumferential groove in the body. The ends of passage 101 may be sealed by O-rings 116 and 117.

Any suitable check valve structure may be employed. An advantage of the particular structure shown is that, with the body disassembled, the check valve may be inserted either end to; thus, by merely reversing the check valve body, the device may be made responsive to either increasing or decreasing pressure changes.

As shown, the check valve 100 will open when the pressure rises to allow fluid to flow freely into cylinder 56 so that the pressures on pistons 11 and 12 remain equal and the switch 22 is not actuated. If the pressure change is in the decreasing direction, ball 108 seats and the fluid must escape from cylinder 56 through the restrictor 16. The unbalanced pressure causes the switch to be operated as previously described.

The valve seating spring 109 should exert a very light pressure so that there is no significant resistance to flow through the check valve.

It will be apparent that many modifications of structure may be made by the exercise of skill in the art. The scope of the invention is not to be considered as limited by the detailed description of preferred embodiments of the invention for the purpose of explaining the principles thereof.

I claim:

1. A pressure change responsive device comprising, in combination, first and second expansbile-chamber motors each having a part movable in response to introduction of fluid into the corresponding motor, the movable parts of the motors being in opposed relation, a movably mounted member directly coupled to the movable part of the first motor, resilient means resiliently coupling the said member to the movable part of the second motor, means defining a fluid inlet, means providing open communication between the inlet and the first motor, means providing a restricted passage between the inlet and the second motor connecting the inlet solely to the second motor, and an output device coupled to the said member so as to be actuated by displacement of the member.

2. A pressure change responsive device comprising, in combination, first and second expansible-chamber motors each having a part movable in response to introduction of fluid into the corresponding motor, the movable parts of the motors being in opposed relation, a movably mounted member directly coupled to the movable part of the first motor, variable rate resilient means resiliently coupling the said member to the movable part of the second motor, means defining a fluid inlet, means providing open communication between the inlet and the first motor, means providing a restricted passage between the inlet and the second motor connecting the inlet solely to the second motor, and an output device coupled to the said member so as to be actuated by displacement of the member.

3. A pressure change responsive device comprising, in combination, first and second expansible-chamber motors each having a part movable in response to introduction of fluid into the corresponding motor, the movable parts of the motors being in opposed relation, a movably mounted member directly coupled to the movable part of the first motor, resilient means resiliently coupling the said member to the movable part of the second motor, means biasing the member to a neutral position, means defining a fluid inlet, means providing open communication between the inlet and the first motor, means providing a restricted passage between the inlet and the second motor connecting the inlet solely to the second motor, and an output device coupled to the said member so as to be actuated by displacement of the member in either direction from its neutral position.

4. A pressure change responsive device comprising, in combination, a body, a member mounted in the body for reciprocation along an axis, first and second opposed cylinders in the body coaxial with the said axis, a piston in the first cylinder coupled to the said member, a piston in the second cylinder, a spring coupled between the second piston and the said member, means defining a fluid inlet into the body, the body defining an unrestricted passage from the inlet to the first cylinder, the body defining a second passage from the inlet to the second cylinder, and restricting means in the second passage.

5. A pressure change responsive device comprising, in combination, a body, a cam member slidably mounted in the body for reciprocation along an axis, first and second cylinders in the body coaxial with the said axis, a piston in the first cylinder bearing against one end of the cam member, a piston in the second cylinder, a compression spring coupled between the second piston and the other end of the cam member, means defining a fluid inlet into the body, the body defining an unrestricted passage from the inlet to the first cylinder, the body defining a second passage from the inlet to the second cylinder, adjustable restricting means in the second passage, and cam follower means actuated by the cam member.

6. A pressure change responsive device comprising, in combination, a body, a member including guide surfaces slidably mounted in the body for reciprocation along an axis, the body defining first and second chambers at the ends of the said member, means connecting the chambers to an outlet, a flexible diaphragm in each chamber engaging one end of the member and sealing the chamber from the member, first and second cylinders in the body coaxial with the said axis, a piston in the first cylinder extending into the first low pressure chamber and bearing against one end of the cam member, a piston in the second cylinder extending into the second low pressure chamber, a compression spring in the second low pressure chamber coupled between the second piston and the other end of the said member, means defining a fluid inlet into the body, the body defining an unrestricted passage from the inlet to the first cylinder, the body defining a second passage from the inlet to the second cylinder, restricting means in the second passage, and means actuated by the said member.

7. A pressure change responsive device comprising, in combination, a body, a cam member including guide surfaces slidably mounted in the body for reciprocation along an axis, the body defining first and second chambers at the ends of the said member, means connecting the chambers to an outlet, a flexible diaphragm in each chamber engaging one end of the member and sealing the chamber from the member, first and second cylinders in the body coaxial with the said axis, a piston in the first cylinder extending into the first low pressure chamber and bearing against one end of the cam member, a piston in the second cylinder extending into the second low pressure chamber, a compression spring in the second low pressure chamber coupled between the second piston and the other end of the cam member, means defining a fluid inlet into the body, the body defining an unrestricted passage from the inlet to the first cylinder, the body defining a second passage from the inlet to the second cylinder, adjustable restricting means in the second passage, cam follower means actuated by the cam member, and a switch operated by the cam follower means.

8. A pressure change responsive device comprising, in combination, a movable member, first fluid motor means connected to the member and biasing the member in one direction, a second fluid motor means, including a fluid accumulator, connected to the member and biasing the member in the opposite direction, means defining an inlet for fluid, an open conduit means connecting the inlet to the first motor means, and conduit means having significant resistance to flow in one direction and negligible resistance to flow in the opposite direction connecting the inlet to the second motor means.

9. A pressure change responsive device comprising, in combination, a movable member, first fluid motor means connected to the member and biasing the member in one direction, a second fluid motor means, including a fluid accumulator, connected to the member and biasing the member in the opposite direction, means biasing the member to a neutral position, means defining an inlet for fluid, an open conduit means connecting the inlet to the first motor means, conduit means having significant resistance to flow in one direction and negligible resistance to flow in the opposite direction connecting the inlet to the second motor means, and means coupled to the movable member actuated by movement thereof from its neutral position.

10. A pressure change responsive device comprising, in combination, first and second expansible-chamber motors each having a part movable in response to introduction of fluid into the motor, the movable parts of the motors being in opposed relation, a movable mounted member directly coupled to the movable part of the first motor, resilient means coupling the said member to the movable part of the second motor, means defining a fluid inlet, means providing open communication between the inlet and the first motor, means providing a restricted passage between the inlet and the second motor, means defining a passage having a reversible check valve therein connecting the inlet and the second motor, and an output device coupled to the said member so as to be actuated by displacement of the member.

11. A pressure change responsive device comprising, in combination, first and second expansible-chamber motors each having a part movable in response to introduction of fluid into the motor, the movable parts of the motors being in opposed relation, a movably mounted member directly coupled to the movable part of the first motor, variable rate resilient means coupling the said member to the movable part of the second motor, means defining a fluid inlet, means providing open communication between the inlet and the first motor, means providing a restricted passage between the inlet and the second motor, means providing a unidirectional bypass for the restricted passage, and an output device coupled to the said member so as to be actuated by displacement of the member.

12. A pressure change responsive device comprising, in combination, first and second expansible-chamber motors each having a part movable in response to introduction of fluid into the motor, the movable parts of the motors being in opposed relation, a movably mounted member directly coupled to the movable part of the first motor, resilient means coupling the said member to the movable part of the second motor, means biasing the member to a neutral position, means defining a fluid inlet, means providing open communication between the inlet and the first motor, means providing a restricted passage between the inlet and the second motor, unidirectional valve means connected to by-pass the restricted passage, and an output device coupled to the said member so as to be actuated by displacement of the member in either direction from its neutral position.

13. A pressure change responsive device comprising, in combination, a body, a member mounted in the body for reciprocation along an axis, first and second opposed cylinders in the body coaxial with the said axis, a piston in the first cylinder coupled to the said member, a piston in the second cylinder, a spring coupled between the second piston and the said member, means defining a fluid inlet into the body, the body defining an unrestricted passage means from the inlet to the first cylinder, the body defining a second passage means from the inlet to the second cylinder, and unidirectional restricting means in the second passage means.

14. A pressure change responsive device comprising, in combination, a body, a cam member including guide surfaces slidably mounted in the body for reciprocation along an axis, the body defining first and second chambers at the ends of the said member, means connecting the chambers to an outlet, a flexible diaphragm in each chamber engaging one of the member and sealing the chamber from the member, first and second cylinders in the body coaxial with the said axis, a piston in the first cylinder extending into the first low pressure chamber and bearing against one end of the cam member, a piston in the second cylinder extending into the second low pressure chamber, a compression spring in the second low pressure chamber coupled between the second piston and the other end of the cam member, means defining a fluid inlet into the body, the body defining an unrestricted passage from the inlet to the first cylinder, the body defining second and third passages from the inlet to the second cylinder, restricting means in the second passage, check valve means in the third passage, and cam follower means actuated by the cam member.

References Cited in the file of this patent

UNITED STATES PATENTS

| | | |
|---|---|---|
| 2,244,007 | Harrington et al. | June 3, 1941 |
| 2,368,852 | Lauck | Feb. 6, 1945 |
| 2,642,887 | Renick | June 23, 1953 |
| 2,747,614 | Gray | May 29, 1956 |
| 2,788,063 | Wright | Apr. 9, 1957 |

UNITED STATES PATENT OFFICE
CERTIFICATE OF CORRECTION

Patent No. 2,983,287            May 9, 1961

Robert C. Keetch

It is hereby certified that error appears in the above numbered patent requiring correction and that the said Letters Patent should read as corrected below.

Column 7, line 34, for "movable" read -- movably --; column 8, line 35, after "one" insert -- end --.

Signed and sealed this 17th day of October 1961.

(SEAL)
Attest:

ERNEST W. SWIDER
Attesting Officer

DAVID L. LADD
Commissioner of Patents

USCOMM-DC